United States Patent [19]

Perna

[11] 4,446,469

[45] May 1, 1984

[54] INK JET PRINTER ARRAY

[75] Inventor: Theodore P. Perna, Garland, Tex.

[73] Assignee: Xerox Corporation, Stamford, Conn.

[21] Appl. No.: 364,065

[22] Filed: Mar. 31, 1982

[51] Int. Cl.[3] .............................................. G01D 15/18

[52] U.S. Cl. .................................. 346/140 R; 310/328

[58] Field of Search .................. 346/140 PD; 310/328

[56] References Cited

U.S. PATENT DOCUMENTS 4,243,995 1/1981 Wright et al. ................ 346/140 PD 4,377,814 3/1983 Debesis ........................ 346/140 PD

*Primary Examiner*—George H. Miller, Jr.

*Attorney, Agent, or Firm*—Richard A. Tomlin

[57] ABSTRACT

A pulsed liquid droplet ejecting apparatus array wherein rectangular piezoelectric transducers are arranged abaxially over ink containing chambers. An edge of each transducer is fixed against a reaction block so that on excitation of the transducers by electrical pulses, the transducers extend into the ink chamber ejecting a drop. An improved method for rigidly mounting the piezoelectric transducers to the reaction block for improved efficiency is disclosed. Further, the design includes an improved mechanical crosstalk reducing member comprising a rigid member containing a void.

1 Claim, 3 Drawing Figures

INK JET PRINTER ARRAY

The invention relates to a pulsed liquid droplet ejecting apparatus wherein a piezoelectric transducer is arranged abaxially to an ink channel so that when the transducer is excited, it expands in the direction of the channel compressing it and the liquid therein. Specifically, the invention relates to an ink jet printer array in which a stiffening member containing a void is placed between adjacent jets in the array to eliminate mechanical "crosstalk" between jets. Additionally, the array is designed to efficiently utilize the drive pulse energy and to minimize physical jet failure.

In a pulsed drop-on-demand liquid droplet ejecting system, such as an ink jet printer, transducers are used to cause expulsion of ink as droplets from a small nozzle or jet. An array of such jets is often utilized in high-speed, high-resolution printers. As is well known, the rate of printing and the resolution of the printed image depend on the number of jets; and, therefore, by implication, the closer the jets are to one another in general, the faster the images can be produced and with higher image resolution.

One type of ink jet that is well suited for incorporation in such an array is that shown in U.S. Pat. No. 4,243,995, issued Jan. 6, 1981, to Allen T. Wright and Kenneth H. Fischbeck, and assigned to the assignee of this invention. In that arrangement, a rectangular transducer is aligned abaxially to an ink containing channel. On application of an electrical voltage drive pulse across the width of the transducer, the transducer expands into the ink containing channel ejecting a drop therefrom. An array of such jets can suffer from a problem common to all drop-on-demand ink jet arrays when the jets are spaced very close to one another; that is, the response of one jet in an array to its drive pulse can be affected by the simultaneous application of a drive pulse to another nearby jet. In a drop-on-demand printer, this can seriously affect system operation since the jets are fired only as required. In a drop-on-demand system, a particular jet may be fired alone or together with an adjacent jet or both adjacent jets or several adjoining jets. When a jet in an array of jets is firing, there are two primary causes of array crosstalk. First, there is the transmittal of drive pulse pressure waves through the solid material in which the jets are formed; second, there is the transmittal of pressure waves through the common interconnecting liquid ink supply system. This invention is concerned with minimizing the first type of interaction or the "mechanical crosstalk". The problem created by mechanical crosstalk is droplet misplacement or, in the extreme case, the spurious ejection of droplets from a jet or jets that were not pulsed. It has been found that by positioning a rigid member containing a void between jets, mechanical crosstalk can be effectively reduced. A second advantage of the array design of this invention is that the piezoelectric members are rigidly embedded in a reaction member, which provides a rigid base or foundation against which the piezoelectric member can "push". A third feature of this invention is that the piezoelectric member is "deactivated" at the interface between the piezoelectric member and the supporting reaction block to minimize fatigue failure of the interfacing joint. It is known that the piezoelectric members, when excited at high rates, generate heat that causes deterioration of the piezoelectric members. The stiffening members utilized herein provide the added benefit of acting as thermal heat sinks for this undesirable heat build-up reducing piezoelectric member deterioration.

The invention is described below with reference to the drawing, which shows a single preferred embodiment of the ink jet array design of the present invention.

The Figures are greatly exaggerated in size, and the various layers and members are not drawn to scale.

Figure 2:
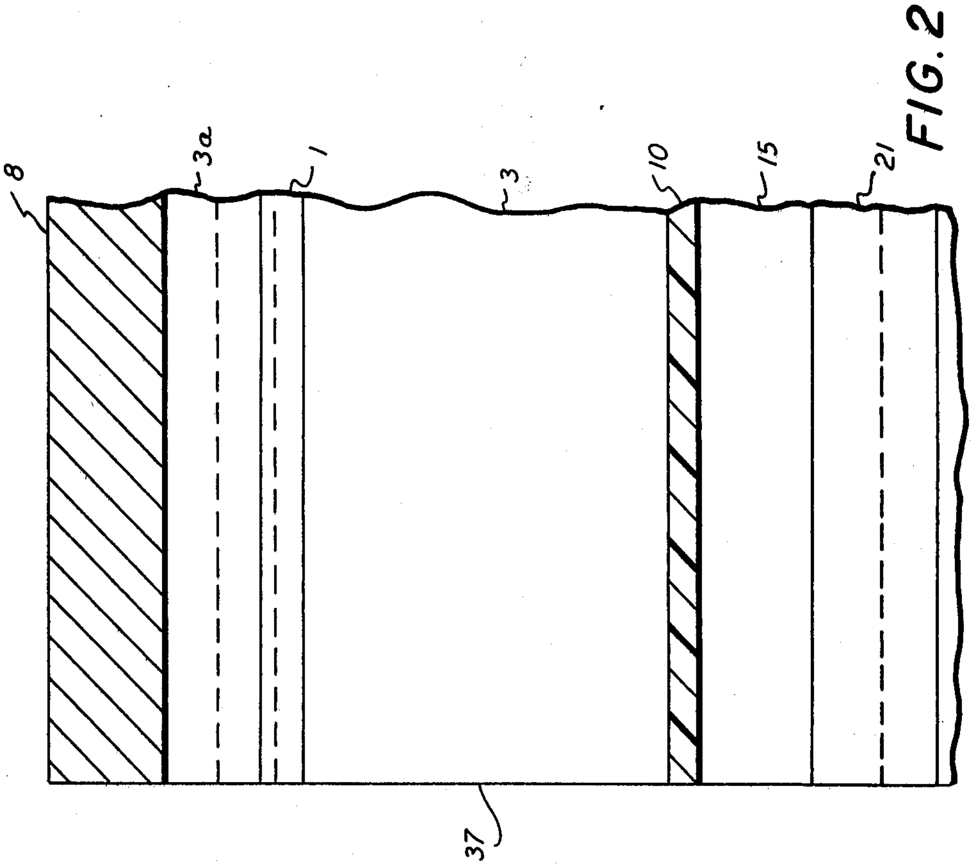
FIG. 2 is a side-sectional view along lines 2—2 of FIG. 1.
Figure 1:
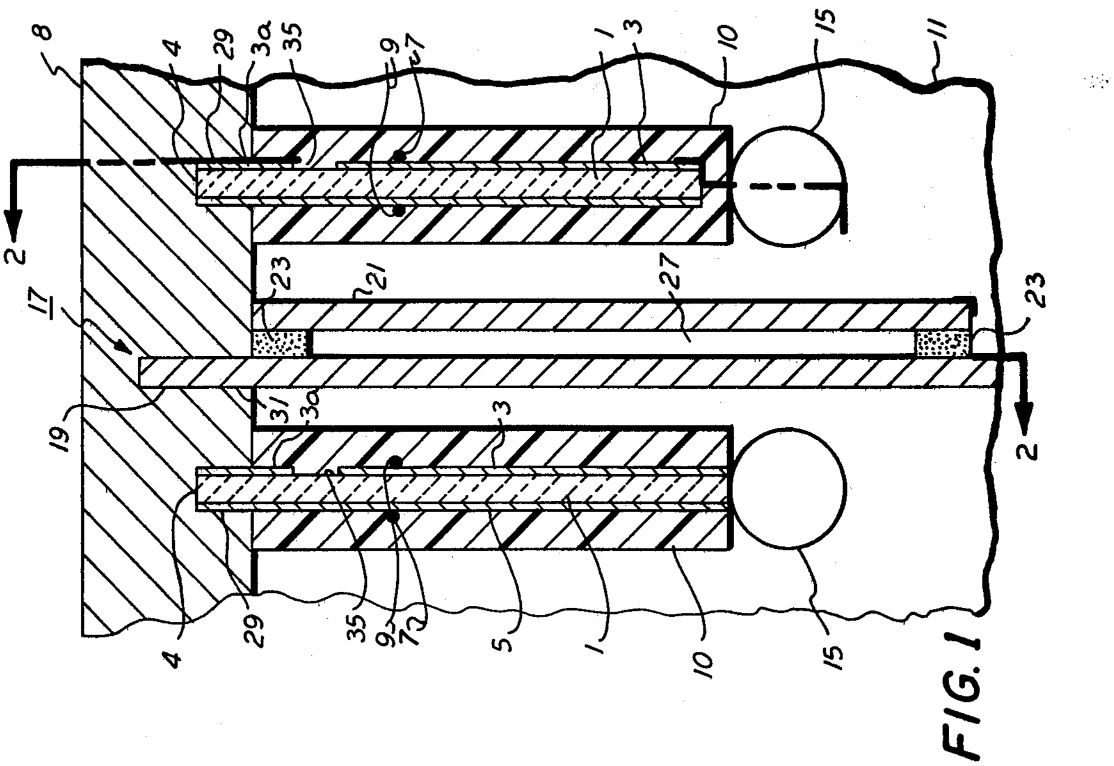
FIG. 1 is a cross-sectional end view of an array showing two ink jets with a crosstalk reducing member interposed between them.
Figure 3:
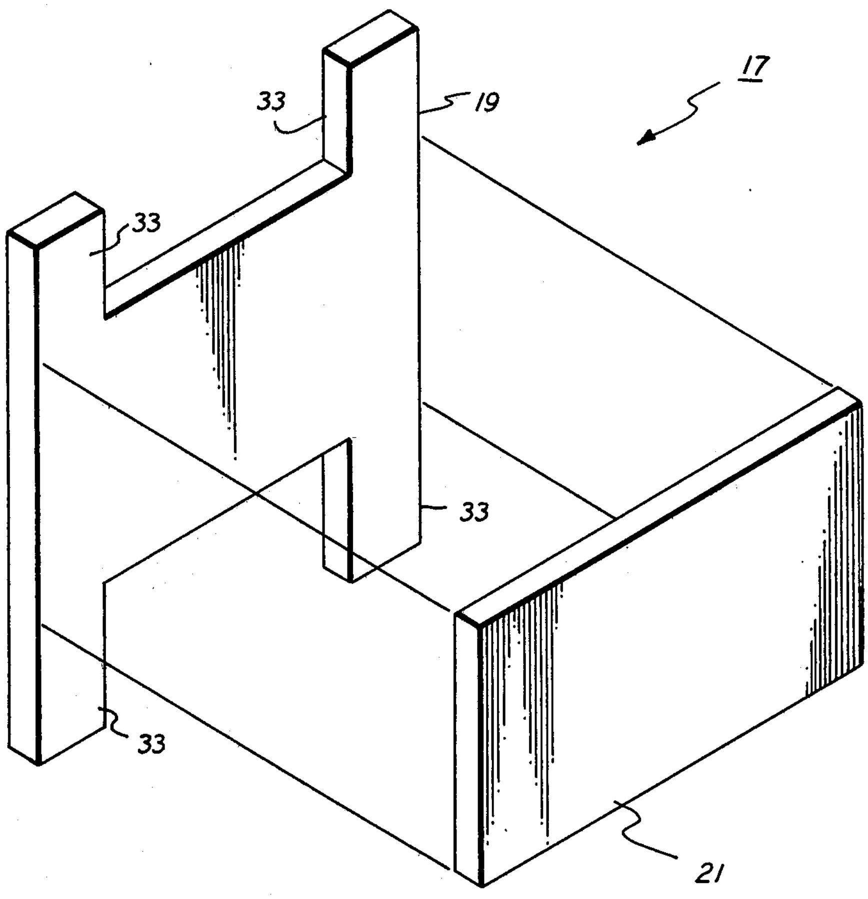
FIG. 3 is an exploded view of the preferred crosstalk reducing member of FIG. 1.

Referring now to the Figures, there is shown piezoelectric member designated as 1. Piezoelectric member 1 is coated on its sides with conductive electrode materials 3 and 5; with 3 being the active electrode, and 5 being the common electrode. A gap 35 in active electrode 3 is provided so that the portion of the electrode encased in reaction block 8 is not electrically connected to the remainder of active electrode 3 for reasons explained further herein. An electrical voltage pule generator (not shown) is connected to active electrode 3 and common electrode 5 by electrical leads 7 and 9, respectively. Piezoelectric member 1 is polarized in the direction from the surface on which common electrode 5 is formed to the surface on which active electrode 3 is formed during manufacture so that application of an electrical field in a direction opposite to the polarization direction causes the piezoelectric member 1 to become thinner as is well known. When this occurs, piezoelectric member 1 expands in height and in length as explained in U.S. Pat. No. 4,243,995, the disclosure of which is hereby incorporated by reference. Since piezoelectric member 1 is held rigidly by reaction block 8, the expansion in height can only result in the movement of piezoelectric member 1 toward ink chamber 15. Piezoelectric member 1 and electrodes 3 and 5 are coated with a coating material 10. Coating material 10 is a flexible insulating compound capable of providing shear relief between the piezoelectric member 1 and the relatively rigid encapsulating material 11. The movement of piezoelectric member 1 is transmitted through coating material 10 and/or encapsulating material 11 to ink chamber 15. It can be seen that, as piezoelectric member 1 expands and contracts in response to drive pulses applied to active electrode 3 and common electrode 5, shock or pressure waves are developed in encapsulating material 11 by transmission through coating material 10. To prevent these waves from acting on adjoining ink chambers 15, a crosstalk reducing member generally designated 17 is used. This member is shown in exploded view in FIG. 3. Crosstalk reducing member 17 is made up to two steel plates 19 and 21 held together with adhesive 23. Steel plate 19, combined with steel plate 21, forms the space 27 (see FIG. 1), which is variable depending on the thickness of adhesive 23. The plates 19 and 21, being held in spaced relationship by adhesive 23, form a void, which may, for example, contain air or a gas or a partial vacuum that prevents or at least reduces transmittal of pressure waves between plates 19 and 21.

Reaction block 8 is preferably made of metal and is provided with slots 29 and 31, which act as alignment means during manufacture for piezoelectric members 1 and ears 33 on steel plate 19. Piezoelectric member 1 with electrode surfaces 3 and 5 and steel plate 19 are placed in slots 29 and 31. The piezoelectric member is coated with coating material 10. A rod or pin is placed in contact with the bottom coated edge of each piezoelectric member 1. The array is then encapsulated with encapsulating material 11. The rods or pins are removed after encapsulation to form ink chambers 15. The encapsulation rigidly attaches the piezoelectric member 1 and crosstalk reducing member 17 to reaction block 8. Before piezoelectric member 1 is coated with coating material 10, a gap 35 is made by removing a band of active electrode 3 to electrically isolate section 3*a* from active electrode 3. In operation, accordingly, when a drive pulse is applied between active electrode 3 and common electrode 5, there is no potential difference applied between electrode section 3*a* and common electrode 5. This means the piezoelectric member 1 between electrode section 3*a* and common electrode 5 is not subjected to the expansion and contraction occurring in the piezoelectric member 1 between active electrode 3 and common electrode 5. This reduces the possibility of piezoelectric member 1 loosening its bond with reaction block 8 or cracking encapsulating material 11. Such a physical failure would decrease the efficiency of the jet by providing alternate paths for drive pulse energy.

By way of example, an ejector is made up of piezoelectric member 1, which may be, for example, piezoceramic PZT-5 available from Vernitron Piezoelectric Division, Bedford, Ohio, which measures 0.25 mm thick by 5 mm high by 15 mm long and is available coated with poled electrodes. The piezoelectric member 1 is coated with Urethane CPC-39, available from Emerson & Cuming, Inc., Canton, Mass., to a thickness dry of approximately 0.3 mm. Edge 4 and the section 3*a* of the piezoelectric member 1, which are positioned in metallic reaction block 8, are not coated so that piezoelectric member 1 is rigidly held in reaction block 8. Ink chamber 15 measures about 0.75 mm in diameter. In can be tapered to an orifice of about 50 micrometers, or a separate orifice containing member can be joined to the ink jet array at surface 37. An electrical potential application of about 50 volts at a frequency of about 8 kilohertz has been found useful in a printer environment. Encapsulating material 11, which encapsulates the ink chamber 15, piezoelectric member 1, crosstalk reducing member 17 and reaction block 8, may be, for example, epoxy Stycast 1266 or 1267, available from Emerson & Cuming, Inc., Canton, Mass. Steel plates 19 and 21 are made by die cutting or chemically etching a 7 mil thick 303 stainless steel sheet. The adhesive is from about 5 to about 10 mils thick RTV-J silicone rubber, available from Dow Corning, Midland, Mich. By providing the improved rigidity of connection between the piezoelectric member 1 and reaction block 8, the jets can operate more uniformly and efficiently than jets not so rigidly bonded.

Although a specific embodiment and components have been described herein, it will be understood by those in the art that various changes in the form and details may be made therein without departing from the spirit and scope of the invention. For example, piezoelectric member 1 could be replaced by an electroresistive or magnetostrictive member.

What is claimed is:

1. A pulsed liquid droplet ejecting apparatus array comprising:

(a) at least two jets, each of said jets comprising a rectangular transducer arranged abaxially to a channel for containing a fluid;

(b) a rigid member comprising a rigid member having walls in spaced relationship located between said jets for reducing mechanical crosstalk between said jets; and wherein a section of said transducer is held in a reaction member, and said section of said transducer is isolated from transducer activation.

* * * * *